E. R. KNOTT.
POPCORN BRICK AND BAR CUTTING MACHINE.
APPLICATION FILED FEB. 25, 1916.

1,268,854.

Patented June 11, 1918.
3 SHEETS—SHEET 1.

Witness.
Ivan A. Blake.

Inventor
Eustace R. Knott
by Chas. F. Randall
Attorney

E. R. KNOTT.
POPCORN BRICK AND BAR CUTTING MACHINE.
APPLICATION FILED FEB. 25, 1916.
1,268,854.
Patented June 11, 1918.
3 SHEETS—SHEET 2.
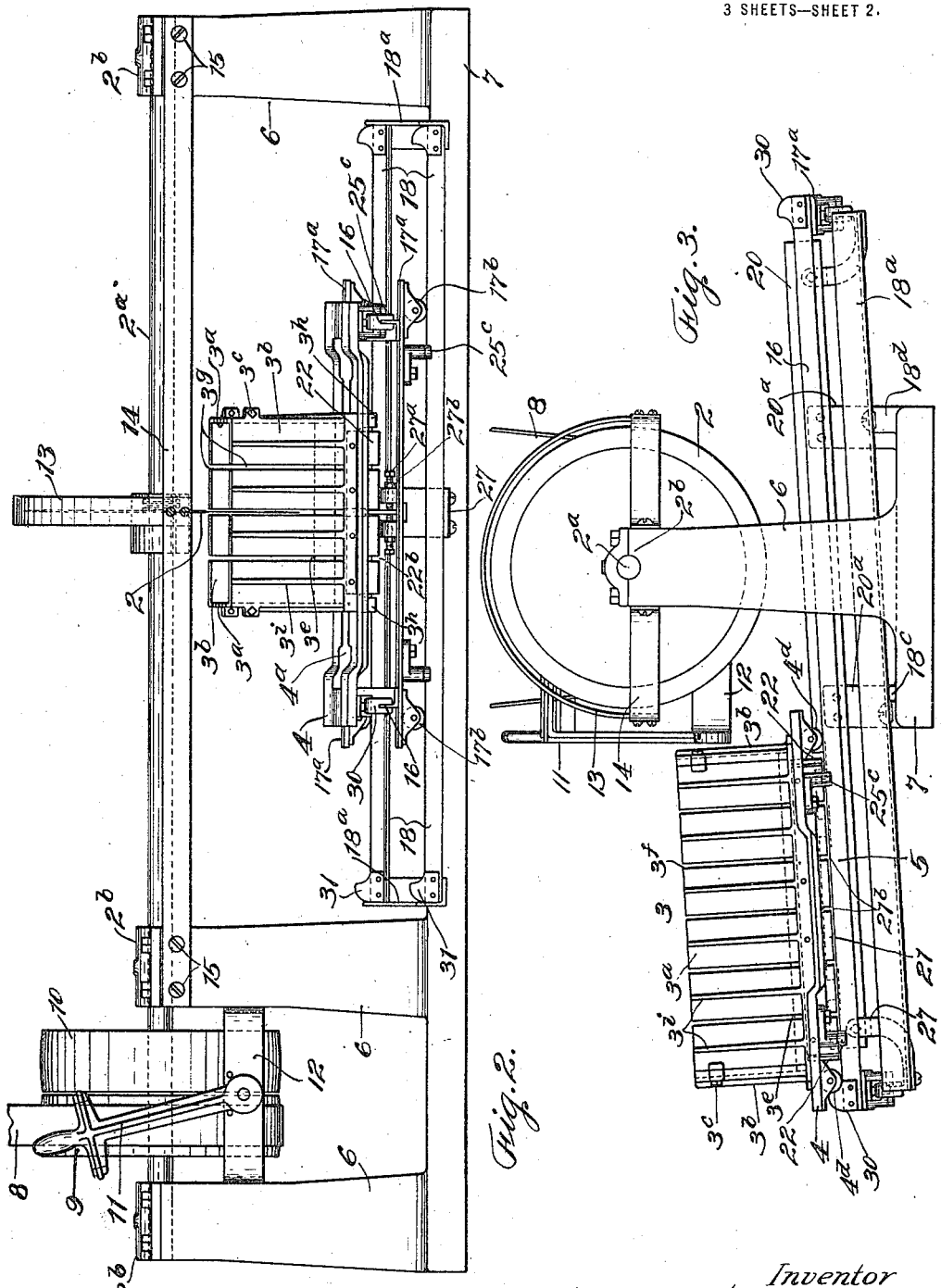
Witness.
Ivan A. Blake
Inventor
Eustace R. Knott
by Chas. F. Randall
Attorney E. R. KNOTT.
POPCORN BRICK AND BAR CUTTING MACHINE.
APPLICATION FILED FEB. 25, 1916.

1,268,854.

Patented June 11, 1918.
3 SHEETS—SHEET 3.

Witness
Ovan A. Blake.

Inventor;
Eustace R. Knott
by Chas. F. Randall
Attorney.

UNITED STATES PATENT OFFICE.

EUSTACE R. KNOTT, OF SHARON, MASSACHUSETTS.

POPCORN BRICK AND BAR CUTTING MACHINE.

1,268,854.  Specification of Letters Patent.  Patented June 11, 1918.

Application filed February 25, 1916. Serial No. 80,528.

*To all whom it may concern:*

Be it known that I, EUSTACE R. KNOTT, a citizen of the United States, residing at Sharon, in the county of Norfolk, State of Massachusetts, have invented a certain new and useful Improvement in Popcorn Brick and Bar Cutting Machines, of which the following is a specification, reference being had therein to the accompanying drawings.

In the manufacture of pop-corn confection sheets of pop-corn are formed into bricks or bars of different proportions and are made up into packages containing each a number of bricks or bars, usually of assorted flavors, inclosed within a suitable wrapper. The invention has relation to machines of a kind sometimes used for cutting up sheets into bricks or bars as aforesaid and has reference more particularly to improved means of positioning for successive cuts the container for the prepared sheet or sheets of the material and for guiding the same in the movements thereof whereby the material is presented to the action of the cutter. The features of the invention are useful equally in connection with the cutting of a single sheet of prepared pop-corn into bricks or bars or of a stack of sheets of different colors or flavors corresponding with the assortment which it is desired to include in a single package.

My invention enables the container and its contents to be positioned conveniently and quickly with reference to the cutter for each of the successive cuts desired to be made and for guiding them with certainty in their presentation to and movement past the cutter and greatly facilitates and expedites the various operations in connection with the work of cutting the sheet or sheets into the required bricks or bars.

The invention consists essentially in the combination with the container or so-called rack for containing the stock to be cut, and which is movable relatively with respect to the cutter to present the said stock to the cutter so as to be cut thereby, of novel indexing and guiding means coöperative with the rack and by means of which its operating position with respect to the cutter is fixed or determined for each of the successive cutting operations and by which it is guided during the movement relative to the cutter for the cutting operations.

The invention further consists of means arranged and constructed to provide for effectually guarding the operative from injury by the cutter and by which the movement of the container or rack toward the cutter is impeded unless the rack has been properly mounted on its associated member of the machine.

Having reference to the drawings,—

Fig. 2 is a front elevational view of the machine with the parts in the position shown in Fig. 1.

Fig. 3 is an end elevation of the machine looking toward the right end of Fig. 2.

Figure 1:
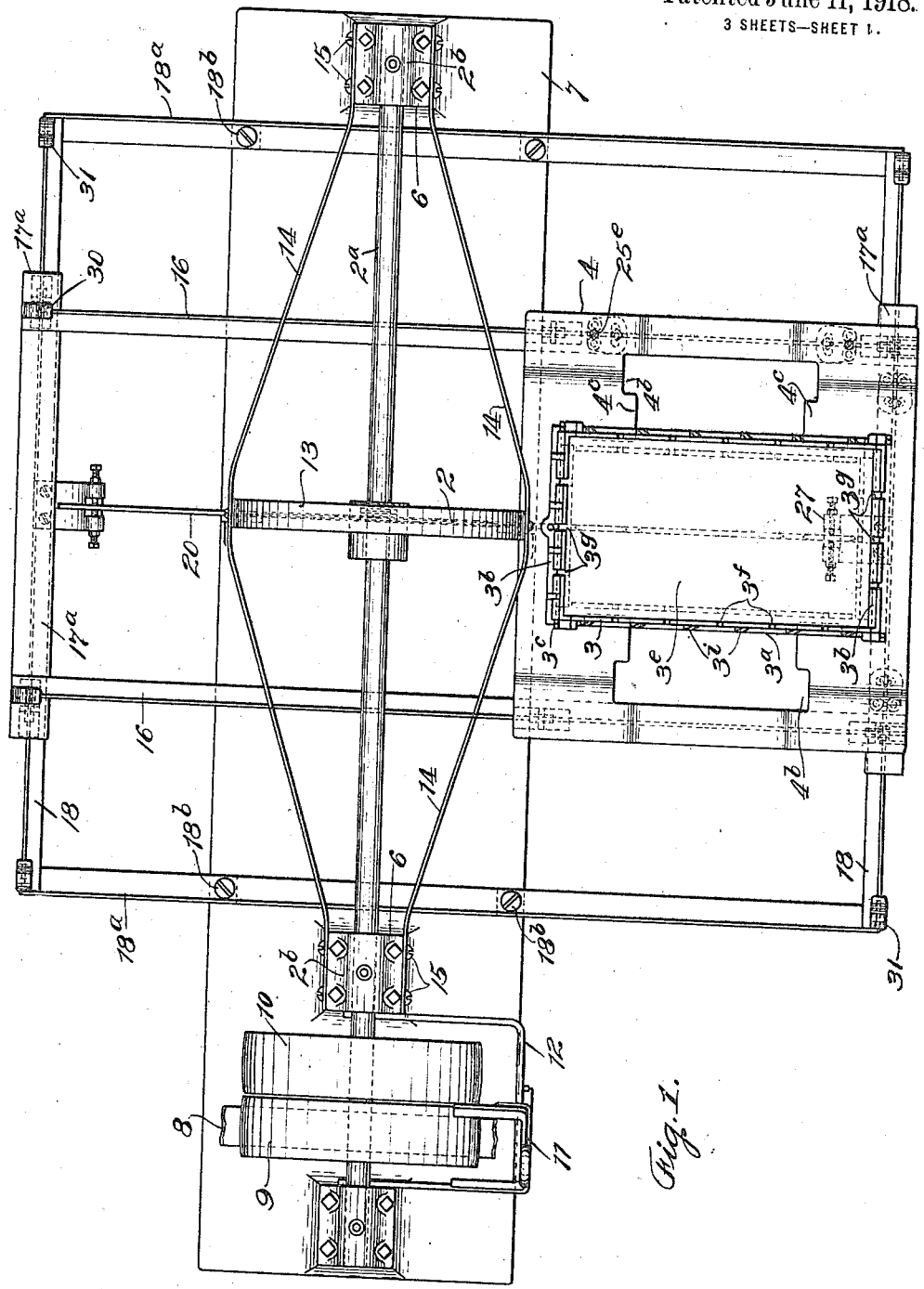
Figure 1 is a plan view of the machine showing the stock-carrying rack with its carrier in the forward position with respect to the cutter and having a pair of the slots in the rack end walls alined with the cutter.

The pop-corn to be subsequently cut into bricks or bars is usually stirred or mixed in suitable apparatus to give to it the desired color or flavor and this batch is then divided and compressed into rectangular sheets of desired proportions. These sheets are then in readiness to be divided or subdivided into bars, bricks, or cakes as desired. The illustrated form of the invention comprises a receptacle hereinafter referred to as a rack forming a rectangular chamber approximating the size of the rectangular sheets into which the pop-corn has been previously compressed. The rack is made of suitable depth so as to hold a plurality of superposed sheets of pop-corn, and mounted for movement in or parallel to the plane of a suitable type of cutter, here shown as a rotary disk, and is also movable in a path at right angles to the plane of the cutter, the walls of the rack being adapted to admit of the passage of the cutter perpendicularly through and across the several superposed sheets of pop-corn in the rack so that these are all cut in one plane at one operation and then by a relative shifting lateral movement of the rack, the cutter is then again passed through the rack and the superposed sheets to divide the latter on another plane parallel to the first plane of cut. The rack is so constructed and arranged that it can be changed from one position, with relation to the cutter, to another position at right angles to the first, so that by transverse movement of the rack with relation to the cutter and then, by movement of the rack parallel to the plane of the cutter, the sheets of stock in the rack are further divided by a series of parallel kerfs so that the superposed sheets are subdivided into rectangular bars of predetermined proportions which are defined in their length and width by suitable indexing means.

The illustrated machine embodies a rotary cutter-disk 2 and a receptacle or rack 3 of suitable proportions which is mounted upon a rack-carrier 4 adapted for movement in a direction parallel with the plane of the rotary cutter 2 so as to carry the rack 3 and its contents into the path of action of the cutter, the carrier 4 also being adapted for movement transversely the plane of the cutter 2 by means of a laterally shiftable main carriage 5 whereby the rack, and its contents to be severed by the cutter, can be moved into a plurality of parallel positions in each of which the carrier 4 may be moved to carry the contents of the rack 3 to and past the knife.

The cutter 2 is secured upon a shaft $2^a$ mounted in bearings $2^b$ on suitable uprights 6 on a bed 7. The shaft $2^a$ is actuated through means of a suitably driven belt 8 which is shiftable at will by the operative from a loose pulley 9 on the shaft $2^a$ to a tight pulley 10 thereon and vice versa. The belt 8 may be shifted from one pulley to the other by a belt shipper 11 pivotally mounted on a bracket or support 12 connected to adjacent uprights 6, 6.

For the purpose of effectually guarding the hands and arms of an operative from contact with the rotating cutter 2 the latter is covered at its upper portion by a semi-circular guard 13, the ends of which are secured in horizontal, diametrically opposite, supporting strips 14, one in front of and one in rear of shaft $2^a$, and which are bent or converged endwardly toward, and fastened by screws 15, to the upper portions of two of the standards 6, 6, The rack 3 for holding the several superposed compressed sheets of pop-corn to be divided and sub-divided by the cutter 2 comprises a pair of similar and opposite, parallel side-wall members $3^a$ and a pair of opposite and similar, parallel end members $3^b$. The members $3^a$ and $3^b$ are secured together in their respective positions by screws or other suitable fastening means $3^c$ to form a rectangular box or receiver of suitable length and width and depth. The side and end members $3^a$ and $3^b$ are provided on their inner surfaces and near their lower edges with longitudinally extending shoulders $3^d$, Fig. 4, forming a rectangular support for a removable board or bottom member $3^e$, Figs. 1 and 3, upon which the sheets of stock to be cut are superposed in the rack. The rack 3 is mounted, etc., so as to enable it to be moved with relation to the cutter 2 in a path to permit the cutter to pass from side to side through the rack 3 with the lowermost edge of the cutter 2 passing just above the plane of the rack bottom $3^e$ so that the sheets of stock in the rack will be severed in a plane perpendicular to the sheets. To permit the passage of the cutter 2 in this manner through the rack 3, the sides $3^a$ are provided with a series of diametrically opposite slots $3^f$ each extending from the top edge to the sides to a point slightly below the top surface of the rack bottom $3^e$ so as to fully clear the cutter 2 when this enters or passes through the rack. Likewise the end members $3^b$ of the rack are each provided with a series of diametrically opposite slots $3^g$ which also extend from the top edge of the end members to a point therein below the top surface of the rack bottom $3^e$. The slotted walls are reinforced by ribs $3^i$. The length and width of the rectangular pieces into which the sheets of stock in the rack will be cut, will be predetermined by the relative distance or spacing between the slots $3^f$ in the side member of the rack and likewise by the distance between the slots $3^g$ of an end member $3^b$. A number of racks are contemplated having slots differently spaced, and different sizes of pieces may be produced simply by the interchange of one rack 3 for another having the requisite slot spacing.

Figure 4:
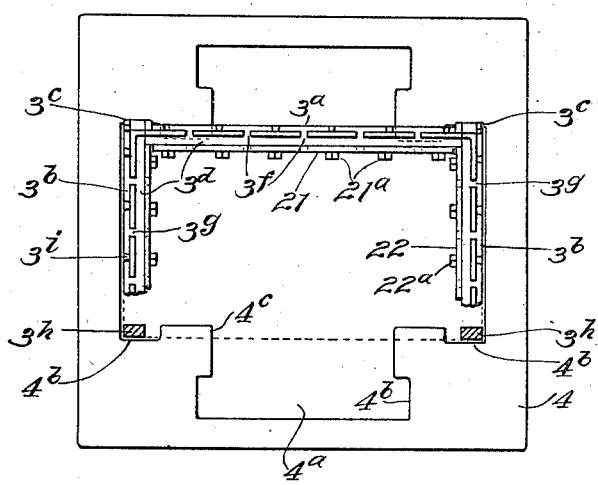
Fig. 4 is a detail plan view of the carrier separate from the machine and showing the stock-feeding rack partly in plan view and partly broken away and disposed on the carrier in a position at right angles to its position in Fig. 1, certain lugs for registering the rack in position being in horizontal section.

The rack is made and designed so as to be removably mounted upon rack-carrier 4, Fig. 4, which, in the form illustrated, comprises a substantially rectangular plate having a central aperture or opening $4^a$, shown in plan as cruciform and having reëntrant shoulders $4^c$ on which the sides of the rack 3 are adapted to rest and register. To secure a proper register and admit the easy mounting or withdrawal of the rack 3 as to the carrier 4 the end members $3^b$ of the rack are here shown as being provided with downwardly extending lugs or legs $3^h$, Figs. 2 and 4, of which there is one at each corner of the rack, adapted to register approximately with the complementary corners or recesses $4^b$ of the opening $4^a$ in the carrier 4. The purpose of providing the carrier 4 with a cruciform opening $4^a$ is to permit of the turning or disposition of the rack 3 in either of positions which are at an angle of 90° to each other on the carriage. The extreme diametrical length of the carriage opening 4ª is substantially equal to the length of the rack 3 and therefore when the rack is turned from the position shown in Fig. 1 to the position shown in Fig. 4, the end lugs or legs 3ʰ of the rack will register properly with the recesses 4ᵇ of the carrier opening 4ª. The rack 3, when disposed in either of its angular positions upon the carrier 4, rests with its lower side edges on the reëntrant shoulders or ledges 4ᶜ formed in the cruciform opening 4ª of the rack-carrier 4 while the downwardly projecting corner lugs 3ʰ of the rack register with the respective recesses 4ᵇ and thus determine approximately the relative position of the rack on the carrier.

To permit the ready movement of the rack 3 toward and from the cutter 2 the carrier is provided with a plurality of casters 4ᵈ of which there is one disposed at each corner of the carrier 4 and which operate in pairs upon parallel rails 16 forming part of the carriage 5, arranged transversely relative to the axis of shaft 2 and along which the carrier 4 is readily movable toward, under, and sufficiently past the rotary cutter 2 to permit the latter to effectually sever the contents of the rack 3.

The lateral movement of the rack 3 and its carrier 4 is provided for and accomplished by suitable means relatively shiftable as to the cutter 2 and which in the present form comprise the main carriage 5 of which the rails 16 supporting the casters 4ᵈ of the rack-carrier form parallel side elements. The ends of the rails 16 are suitably secured to front and rear parallel cross-members 17ª which, with the parallel rails 16, form a rectangular carriage upon which the rack-carrier 4 with the rack 3, is movable toward and from the disk cutter 2. The carriage is supported with capacity for lateral movement upon front and rear tracks 18 parallel with the shaft 2 and secured at their ends upon fixed side-members 18ª which are secured by fastening screws 18ᵇ at the desired spaced positions upon forward lugs 18ᶜ and rear and higher lugs 18ᵈ on the bed member of the frame. The difference between the height of the front supporting lugs 18ᶜ and that of the rear supporting lugs 18ᵈ of the side members 18ª cause the latter to tilt upwardly from the front end toward the cutter 2, thus serving to cause the roller-supported carrier 4 to automatically resume a normal position at the front and lower end of the supporting tracks, 18, which keeps the rack from accidentally rolling backward toward cutter 2. The carriage is provided with sets of casters 17ᵇ arranged in respective pairs to travel along the tracks 18. By this arrangement the carriage may be readily shifted transversely along its tracks 18 so as to change the transverse position of the rack-carrier 4 with its superposed rack 3 as may be necessary to bring the respective pairs of opposed slots of the front and rear side members of the rack successively into alinement with the plane of the rotary disk 2 so as to permit the free entrance and passage of the latter through the rack and the stock therein contained to be cut.

Figure 5:
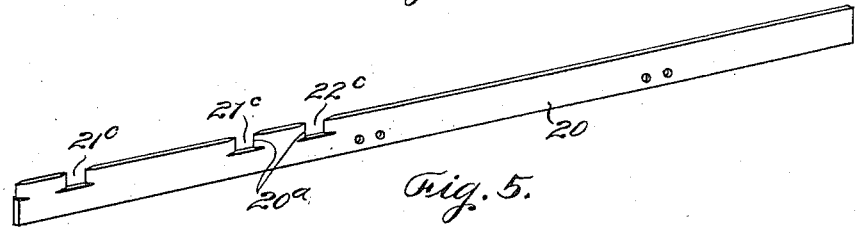
Fig. 5 is a perspective view of the gage-member detached from the machine.

It is one of the important features of the present invention to provide for the ready alinement or accurate centering of the slots 3ᶠ or 3ᵍ of the side and end member of the rack with the cutter 2 during the operation of the machine. To facilitate this respective centering or alinement and also to insure the proper line of movement of the rack 3 toward and from the cutter 2, there is provided means for indexing and gaging or controlling the movement of the rack 3 with respect to the cutter 2. This rack indexing and gaging and alining means includes a hardened fixed gage bar 20, shown separately in Fig. 5, arranged below and in the plane of the disk 2 and rigidly secured intermediate its ends upon upright supports 20ª on the bed 7. The gage inclines downwardly and forwardly, and upwardly and rearwardly upon its supports 20ª at the same angle as rails 16, to form an effective guide to hold the rack 3 so that the knife-receiving slots 3ᶠ and 3ᵍ thereof will properly aline with the cutter 2. Coöperation between the rack 3 and its controlling and indexing gage 20 is obtained by means of indices of a suitable type on the rack, consisting, in the present instance, of a pair of similar and oppositely arranged parallel hardened index plates 21 fastened by screws or other suitable means 21ª, Fig. 4, to the inner surfaces of the side members 3ª of the rack 3 just below the plane of the rack bottom 3ᵉ. Each of the side index plates 21 is provided with a plurality of downwardly opening nicks or slots 21ᵇ in its lowermost edge, the width of each slot 21ᵇ being slightly greater than the thickness of the complementary fixed gage 20 which is adapted to slidably fit the slots 21ᵇ when registered therewith. The slots 21ᵇ aline with the respective wall slots 3ᶠ. The end members 3ᵇ of the rack 3 are likewise provided with hardened end index plates 22 fastened by screws, or other suitable fastenings 22ª, to the inner surfaces of the end members 3ᵇ of the rack and in positions below the rack bottom 3ᵉ. The end index members 22 have a plurality of gage slots 22ᵇ adapted to slidably fit with the fixed gage bar 20 and alined with slots 3ᵍ of the rack 3. It will be seen that when the opposite index plates 21, 22, are fastened properly in position to the inside lower surfaces of their respective members of the rack, they present their respective gage receiving apertures or slots 21$^b$, 22$^b$, in opposite alinement. When the rack 3 has been adjusted upon its carrier 4 and the latter moves upwardly along the rails 16 of its supporting carriage 17, if the gage 20 be properly registered with a set of alined slots 21$^b$ or 22$^b$ according to the angular position of the rack on the carriage, then the gage 20 will enter the slots of the index members respectively and interlock therewith and accurately position the rack 3 on the support 4 and automatically center the slots 3$^f$ or 3$^g$ of the rack as the case may be, with the edge of the rotary cutter 2 so that upon movement of the carrier 4 up the incline rails 16, the cutter 2 will pass into the slotted end or side of the rack without interference and pass readily across the rack to sever the material contained therein. It is obvious that the rack walls may be extended down in place of the demountable members 21, 22, and that the centering slots 21$^b$, 22$^b$, would then be made in the bottom edge of the rack.

To permit of the lateral movement of the rack carrier 4 with the rack 3 thereon with respect to the cutter 2 and the fixed gage bar 20 without interference of the slotted index members 21 or 22, the gage 20 is provided intermediate of its length, with a plurality of clearance apertures which allow the index members 21 or 22, according to the position of the rack 3 on the carrier 4, to shift laterally as to the gage 20 when the carrier with the rack is in its lowermost position on the carriage 17. With the rack 3 and the carrier 4 in the position shown in Figs. 1, 2, and 3, the lowermost end index 22 will clear the lower end of the gage 20, which preferably is of such length as to provide a space for such clearance of the lower index member and the upper index 22 of the rack 3 will be permitted to pass through a clearance notch or aperture 22$^c$, so positioned in the gage 20 as to register with the upper end index member 22. If the rack 3 be adjusted in the position shown in Fig. 4, upon the carrier 4, at which time it is disposed lengthwise at an angle of 90° to its position in Fig. 1, then the side index members 21 will register with and clear respective apertures or notches 21$^c$, in the lower end of the gage 20, when the carrier 4 with the rack 3 is in its lowermost position on the supporting rails 16. When the rack 3 is in either of its positions on the carrier 4 and the latter is standing in the position shown in Fig. 3, the rack and carrier may be adjusted transversely to the plane of the disk cutter 2 by a lateral shifting movement of the carrier-carriage along its supporting rails 18.

In the operation of the machine the operative places the loaded rack 3 in suitable position upon the carrier 4 this adjustment being facilitated by the relatively free fitting of the guide lugs 3$^h$ of the rack 3 into the respective corner seats 4$^b$ in the carrier 4. Then by grasping the front and adjacent corners of the carrier the latter will be shifted, upon the application of the requisite pressure, by lateral movement of the carriage to bring the rack 3 into such position, with respect to the cutter 2, that one of the sets of opposite slots 3$^f$ or 3$^g$, according to the position of the rack on the carrier, will aline with the edge of the cutter 2. This position is readily determined by the co-action of the notched index members 21 or 22 with the adjacent edge of the fixed gage 20. For the purpose of expediting and facilitating the registration of the slots 21$^b$ or 22$^b$ of the respective index plates with the fixed gage 20, the opposite surfaces of the latter at the slots 21$^c$ and 22$^c$, which are coöperative with the slotted index members 21, 22, are preferably sharpened to present knife edges 20$^a$ so as to more readily enter the slots 21$^b$ or 22$^b$ when the latter move into alinement with the knife-edges 20$^a$ of the gage 20. The operator, having shifted the carriage to carry the rack-carrier 4 with its superposed rack 3 into a position so that one or the other of the index members will present one of their index slots 21$^b$ or 22$^b$ to the knife edges 20$^a$ of the index 20, may then push the carrier 4 up the inclined rails 16 during which movement the rack 3 will be automatically shifted into position by the gage 20 to precisely aline and center the cutter receiving slots 3$^f$ or 3$^g$ with the edge of the cutter. Upon further upward movement of the carrier 4 the rack 3 will be passed under the cutter until the latter traverses the stock in the rack to be severed whereupon the rack-carrier 4 may be drawn forwardly and downwardly again until it assumes its lowermost position on the carriage 17 when its index members 21 or 22 will be alined with the respective clearance apertures of the gage 20 and thereby permitting the movement of the index members and the rack 3 and its rack-carrier 4 and the carriage 17 transversely of the cutter 2 to bring another opposite set of knife receiving slots of the rack 3 into alinement with the edge of the cutter 2 and permit a repeated upward and rearward movement of the rack-carrier 4 with the rack to again have the material severed by the cutter in a plane parallel to that in which the material was previously cut. After the operator has successively advanced the rack by the upward movement of the carrier 4 to effect a cutting of the stock in as many planes as there are slots in the end or side indices of the rack, he then lifts the rack 3 from its then position on the carrier 4 and turns it, in this case, in an angle of 90° so that its longitudinal sides are presented to the cutter 2 and then by the proper transverse shifting of the rack-carrier 4 to bring the rack slots into requisite alinement with the fixed gage 20, the material in the rack is sub-divided by as many perpendicular cuts, transverse the rack, as there are knife-receiving slots in the wall presented to the knife.

Figure 6:
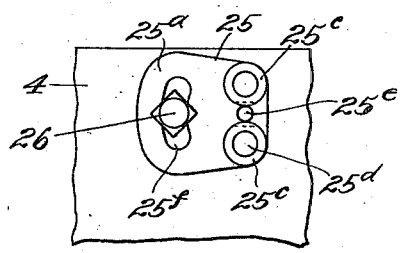
Fig. 6 is an underneath plan view on an enlarged scale, of a roller bracket as fastened upon the portion of the carrier.
Figure 7:
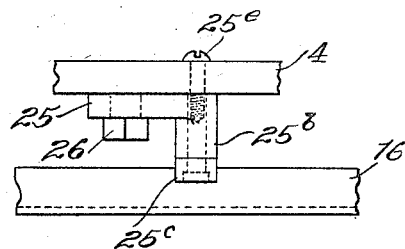
Fig. 7 is a side elevation of the roller bracket showing the rolls as engaging a rail.

Unnecessary lost motion of the carriage 5 upon its tracks 18 may be eliminated by providing take-up brackets 25, Figs. 6 and 7, each having a pair of parallel bosses or hubs $25^b$ with axes projecting in a common plane and each carrying a roll $25^c$ held in position by a pin $25^d$. The perimeters of the rolls $25^c$ are preferably spaced a distance from each other to permit the interposition of, and a relative movement along, a rail 16 or 18 as the case may be. Each bracket 25 is mounted upon the lower surface of one of the members, as carrier 4, Fig. 7, by means of a screw $25^e$ disposed in the plane of and intermediate, the axes of the track engaging rolls $25^c$. The bracket is adapted for pivotal adjustment about its pivot $25^e$ to provide for angular change of position of the rolls $25^d$ so as to cause them to be turned into rolling contact respectively with each side of the intervening track or roll and is provided with an arcuate slot $25^f$ concentric with the center of the pivot $25^e$ and through which passes a fastening screw or bolt 26 by which the bracket 25 may be fastened to the member or part to which it is to be attached. In Fig. 3 a pair of these adjustable take-up devices is shown as mounted and adjusted upon the lower side of the carrier 4 so as to embrace the rail 16 along which the carriage moves, each bracket 25 being swung on its pivotal screw $25^e$ which passes through the carrier 4 and is then clamped in its desired angular position as to the rail 16 to effectually prevent lateral movement or lost play between the carrier 4 and the rail 16 on which the rolls $25^d$ operate. In a similar way, lost motion of carriage member $17^a$ with respect to its supporting tracks is eliminated by fastening a pair of the brackets 25 with take-up rolls $25^c$ on one of its members as shown in Fig. 1.

The lower, overhanging end of the fixed gage 20 is supported and accurately adjusted with relation to the plane of the disk cutter 2 by a support and adjusting device comprising a rearwardly and upwardly curved bracket 27 which is fastened to the lower longitudinally extending rail 18 and is bifurcated at its upper end to receive the end of the gage bar 20. This latter is adjustable as may be necessary to bring it into plane of the cutter 2 by means of adjusting screws $27^a$ disposed in alinement with each other in the end of the bracket and the points of which engage the intervening end of the gage bar 20. In turning the screws $27^a$ in one direction or the other, the end of the gage bar is brought into the desired position and the screws are then locked by lock-nuts $27^b$.

The rearward and forward movement of the carrier 4 on its supporting rails 16 is limited by bumpers or stops 30 appropriately secured upon the ends of the said rails and in a similar fashion the lateral movement of the carriage along its tracks 18 is limited at each end of the tracks 18 by bumpers 31.

The rack 3 may be charged with a plurality of the compressed sheets of pop-corn while the rack is in its adjusted position upon the carrier 4 or may be charged while it is removed from the carrier 4. After being charged and repeatedly advanced toward and from the cutter 2 so as to sever the pop-corn sheets in the desired parallel planes to form parallel stacks of bars, the rack is then transposed to a right-angular position on the carrier 4 and the latter is transversely shifted in successive steps to present the slots in its wall successively to the edge of the cutter 2 and after the repeated movement of the carrier 4 toward and from the cutter 2, the previously cut stacks of bars will be sub-divided into stacks of bricks, the dimensions of which, as before stated, are predetermined by the distances between the cutter-receiving slots $3^f$ and $3^g$. After the stock has been so subdivided the operative lifts the rack 3 from its carrier 4 and carries it to some convenient table, bench or other work-station and by simply lowering the rack 3 over an upwardly projecting stand or support, whose dimensions will permit it to pass upwardly into the rack 3, the bottom $3^e$ with the superposed stacks of bricks will be held stationary while the frame of the rack may be lowered relatively, thus presenting all of the stacks arranged with accuracy and adapted to be readily removed one at a time, and neatly wrapped. It will be seen, therefore, that the present machine provides for rapidly sub-dividing a plurality of superposed pop-corn sheets into a number of stacks of bars, each bar being of approximately the same size, and having smooth surfaces and straight edges, and when again sub-divided by cuts perpendicular to previous cuts, bricks are produced which, also, are smoothly and cleanly cut and all of uniform size and are arranged, in consequence of the design, construction and method of operation of the machine in a plurality of complete stacks of pieces ready to be wrapped.

Another important advantage of the present machine is its provision of means for the protection of the operative from danger of injury by the rotating cutter. The circular guard 13 prevents contact with the upper portion of the edge of the cutter and the horizontal front-guard support 14 beneath which the top of the rack just passes, also serves to effectually bar contact with the edge of the cutter during manipulation of the carrier transversely or toward and from the cutter. Unless the rack 3 is properly seated upon the top of the carrier 4 the rack cannot be moved beneath the lower edge of the front guard bar 14, which is set at such a height above the carrier as to bar movement of the rack unless it is properly set.

I claim as my invention:—

1. In a machine for cutting pop-corn sheets into bricks and bars, the combination with a cutter, and a rack for containing stock to be cut, relatively movable with respect to the cutter to present the stock thereto for the purpose of being cut and turnable to present the stock thereto at different angles, of indexing and guiding means coöperating with the rack to determine its operating position as to the cutter for successive cutting operations, and during its movement past the cutter.

2. In a machine for cutting pop-corn sheets into bars and bricks, the combination, with a cutter, and a rack for containing the stock to be cut, and which is movable to present the stock to the cutter in order to be cut and also is movable transversely relative to the cutter to change the planes of successive cuts, of a gage which coacts with the rack in each of its respective positions after transverse adjustment to hold it alined with the cutter as it moves relative to the cutter for the cutting operation.

3. In a machine for cutting pop-corn sheets into bars and bricks, the combination, with a cutter, and a stock carrying rack for presenting stock to and in the path of said cutter to be cut thereby, of a gage with respect to which the rack is movable transversely to successive positions for cutting operations and longitudinally for cutting purposes at each of said positions, the said gage coöperating with the rack to maintain the latter in fixed path of movement in the plane of the cutter during the cutting operation, and means for adjusting the alinement of the gage with the cutter.

4. In a machine for cutting pop-corn sheets into bars and bricks, the combination, with a cutter, and a stock carrying rack in which the stock is cut upon relative movement to bring the stock into the path of the knife and arranged for transverse movement to the knife, of index means on the rack for determining the parallel lines of cut of the tool in predetermined planes in the stock and a gage coöperating with the index means for maintaining the parts in a predetermined transverse position during the relative cutting movement.

5. In a machine for cutting sheets of pop-corn, the combination, with a cutter, and a rack for holding superposed sheets of stock movable toward the cutter to feed thereto the stock to be cut, of a gage for defining the path of movement of the rack in the plane of the cutter and coöperating with the rack to index the relative parallel position thereof as to the cutter and for permitting free transverse movement of the rack to change the plane of the cut.

6. In a machine for cutting pop-corn sheets into bricks and bars, the combination with a cutter, a stock rack for presenting superposed sheets to be cut to the edge of the cutter, having a path of movement transverse to the edge of the cutter, and indices for indexing the transverse movement into subdivisions for successive parallel cuts, of a gage for controlling movement of and centering the rack in the plane of the cutter at each of said subdivisions whereby the stock is divided by the cutter with a series of parallel cuts.

7. In a machine for cutting pop-corn sheets into bricks and bars, the combination, with a cutter, and a stock holding rack for feeding the stock to be cut to the edge of the cutter and turnably adjustable to present the stock to be cut by the cutter, in planes at right angles to each other, of centering means coöperating with the rack in either of its angular positions to determine the path of movement thereof to the cutter in any one of a series of parallel planes.

8. In a machine for cutting pop-corn sheets into bricks and bars, the combination, with a cutter, and a rack for presenting the stock to be cut to the edge of the cutter, of a carrier upon which the rack is removably supported and by which it is movable in a path parallel to the plane of the cutter, said carrier arranged to normally assume automatically an idle position to hold the rack away from the cutter.

9. In a machine for cutting pop-corn sheets into bricks and bars, in combination, a rotary cutter-disk, an upwardly inclined track arranged below the cutter, a carriage mounted thereon in an inclined position for movement parallel with the cutter axis, a carrier mounted upon said inclined track for movement upwardly toward the edge, and in the plane, of the cutter-disk, and a stock carrying rack movable by the carriage and the carrier in a plane transverse the cutter-disk and in planes parallel to the cutter-disk, whereby the stock is divided into bars with parallel edges by the traverse of the disk, said carrier gravitating normally to an idle position on the inclined track to keep the rack clear of the cutter.

10. In a machine for cutting pop-corn sheets into bricks and bars, the combination, with a cutter, and a rack for presenting the stock to be cut to the edge of the cutter, a carrier for the rack movable in the plane of the cutter to carry the stock thereto to be cut, means for shifting the carrier transversely to the plane of the cutter to present different parallel planes of the stock to the edge of the cutter, of an indexing and guiding means for predetermining the lateral cutting positions of the rack and holding the stock rack in a path of movement parallel to the plane of the cutter during cutting operation.

11. In a machine for cutting pop-corn sheets into bricks and bars, the combination, with a cutter, a receptacle for the stock to be cut, having its walls provided with slots to admit of the passage of the cutter in parallel planes across the stock and the container, and movable in the plane of the cutter and having indices for the slots, of a means coöperating with the indices for indexing the position of the receptacle to center opposite slots in its walls in coincidence with the edge of the cutter and for guiding it in a path in the plane of the cutter.

12. A pop-corn sheet cutting machine comprising, in combination, a cutter, a fixed gage disposed in the plane of the cutter, a rack adapted to admit of the passage from side to side thereof of the cutter perpendicularly through the stock in parallel planes to make successive cuts and adapted for movements transversely to and parallel with the plane of the cutter, and index plates on the rack coöperating with the gage to determine the relative transverse position of the rack as to the cutter and coacting therewith to hold the rack in a path of movement parallel with the plane of the cutter during the cutting operation.

13. A pop-corn cutting machine having, in combination, a cutter, a rack adapted for movements parallel and transversely the plane of the cutter and having its opposite walls provided with opposite slots in parallel planes to permit the cutter to cross through the stock in the rack with a series of parallel kerfs and which said rack is turnable angularly to position of 90° relative to the cutter to permit the movement of the cutter thereacross to make another series of parallel kerfs at right angles to the previously made cuts, whereby the stock is subdivided into rectangular pieces, indices on the bottom of the rack for defining the relative positions of the rack as to the cutter to center the slots respectively in the plane of the cutter edge, and a gage disposed below the rack and providing for free transverse movement of the indices and coöperative therewith to keep the indexed slots in the plane of the cutter during movement of the rack past the cutter edge to cut the stock in the rack.

14. In a machine for cutting pop-corn sheets into bricks and bars, the combination, with a rotary cutter, and a manually operable rack for holding the sheets to be cut and movable transversely and parallel to the cutter to permit it to traverse the stock in parallel planes, of means for locking the rack in each of its positions of transverse adjustment during the movement relative to the cutter for cutting purposes.

15. In a machine for cutting pop-corn sheets into bricks and bars, the combination, with a rotary cutter, a shaft supported at its ends in axially spaced bearing, the said cutter secured on the shaft intermediately its length between the bearings, and a rack arranged for feeding movement to carry the sheets to be cut toward and from the cutter and for shifting it transversely thereto to vary the plane of cut, of a curved guard for the circular edge of the cutter, and a longitudinally extending support for the guard, forming a lateral guard in front of the cutter.

16. In a machine for cutting pop-corn sheets into bricks and bars, in combination, a rotary-cutter disk, a carrier movable parallel with the plane of the cutter, a rack adapted to be removably mounted upon the carrier and registered thereon in definite positions, and movable thereby to carry stock to be cut into the paths of the cutter, and a guard arranged with respect to the cutter to engage and prevent the rack being carried by the carrier to the path of the cutter unless the rack is properly mounted and registered on the carrier.

17. In a machine for cutting pop-corn sheets into bricks and bars, in combination, a rotary cutter-disk, a stock-carrying rack adapted to admit of the passage of the cutter in planes at right angles to each other to cut the stock, and having dependent lugs at its corners, and a carrier for moving the rack in paths respectively transverse and parallel to the plane of the cutter and provided with groups of pockets or recesses, said groups respectively at right angles to each other, the recesses of each group arranged to receive the lugs of the rack, and reëntrant seats intermediate the recesses for supporting the rack.

18. In a machine for cutting pop-corn sheets into bricks and bars, in combination, a rotary-cutter-disk, a stock-carrying rack adapted to admit of the passage of the cutter to sever the stock in parallel planes and parallel cross planes, and having dependent lugs at its corners, a carrier upon which the rack is removably mounted, having a plate or body, to support the rack, with a cruciform, central opening with its opposite sides arranged to receive the corresponding corner lugs of the rack and register the rack on the carriage, index members on and projecting downwardly from the sides of the rack and extending below the carrier plate, and a fixed gage disposed below the carrier, adapted for engagement with the index-members and providing clearance for their transverse relative movement in one path, said gage coöperating with the index members to guide and aline the rack in a path parallel to the plane of the cutter.

19. In a machine for cutting pop-corn sheets into cakes and bars, in combination, a cutter, a gage, a rack for containing sheets of pop-corn to be cut by the cutter and having indices to be engaged by the gage to determine the plane of the cut to be made, and a carrier upon which the rack is adapted to be removably disposed, providing for the coöperation of the rack indices with the gage and movable to carry the rack so that the stock therein will be cut in the desired planes by the cutter.

In testimony whereof I affix my signature in presence of two witnesses.

EUSTACE R. KNOTT.

Witnesses:
CHAS. F. RANDALL,
ELLEN O. SPRING.

Copies of this patent may be obtained for five cents each, by addressing the "Commissioner of Patents, Washington, D. C."